March 12, 1957 A. RANCOURT Re. 24,286

ELEVATOR MECHANISM

Original Filed Feb. 12, 1952 2 Sheets-Sheet 1

INVENTOR.
Alphonse Rancourt.
BY
Ross & Ross
Agents & Atty

ELEVATOR MECHANISM

Original Filed Feb. 12, 1952 2 Sheets-Sheet 2

INVENTOR.
Alphonse Rancourt.
BY Ross & Ross
Agents & Atty.

United States Patent Office

Re. 24,286
Reissued Mar. 12, 1957

24,286

ELEVATOR MECHANISM

Alphonse Rancourt, Pittsfield, Mass.

Original No. 2,649,934, dated August 25, 1953, Serial No. 271,096, February 12, 1952. Application for reissue October 30, 1956, Serial No. 619,373

2 Claims. (Cl. 187—29)

Matter enclosed in heavy brackets [ ] appears in the original patent but forms no part of this reissue specification; matter printed in italics indicates the additions made by reissue.

This invention relates to elevator mechanism and is directed more particularly to leveling apparatus for elevators.

The principal object of the invention is directed to the provision of novel apparatus for leveling an elevator with a floor at which it is stopped to take on or let off passengers or freight.

The novel features of the invention are accomplished by the provision of means between the hoist cable and elevator which is automatically adjusted to level the floor of the elevator with the floor at which the elevator is stopped.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Figure 1:
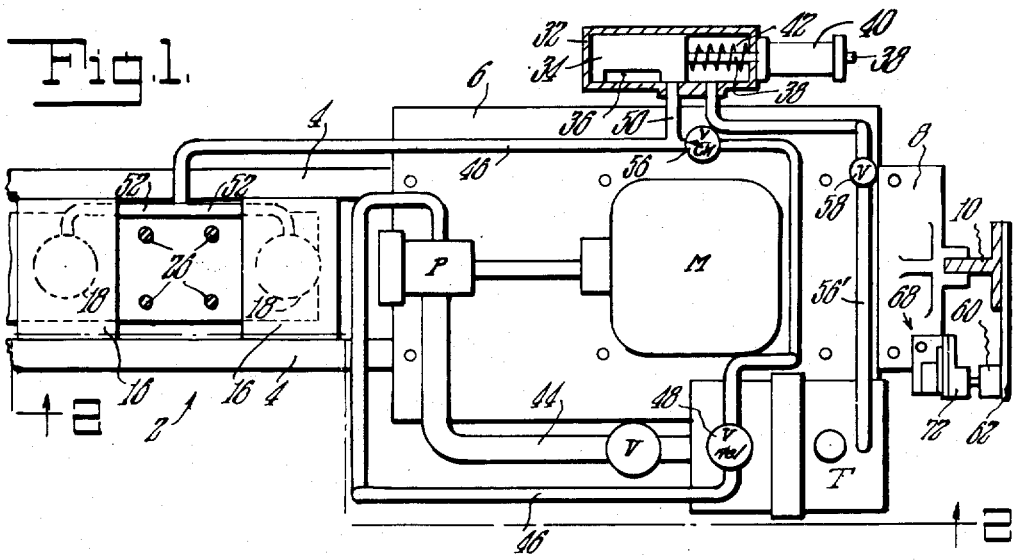
Fig. 1 is a plan view of elevator leveling apparatus shown in combination with the cross head of an elevator.
Figure 2:
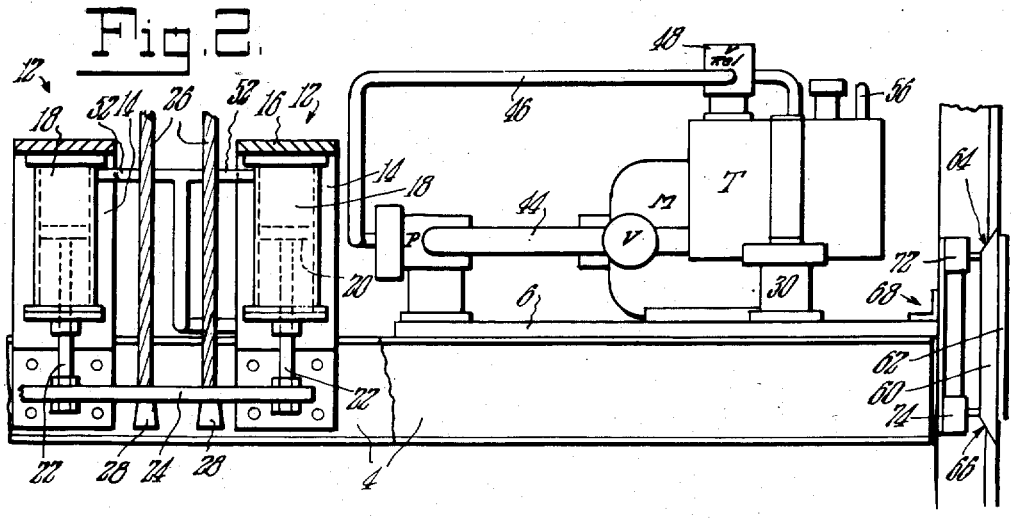
Fig. 2 is a side elevational view of the apparatus shown in Fig. 1.

Referring now to the drawings more in detail, the invention will be fully described.

The crosshead of an elevator is shown at 2 which extends across the elevator shaft and may include a pair of channels or I beams 4. These are secured together by any suitable means such as a plate 6. Shoes, such as 8, are fixed to opposite ends of the crosshead which slidably receive the usual vertically disposed rails 10 at opposite sides of the elevator shaft for up and down movements of the elevator.

Hangers 12 which are in the form of inverted U's have spaced side arms 14 fixed to the channels 4 and upper end or intermediate portions 16.

Closed cylinders 18 have upper ends fixed to portions 16 of the hangers and depend between the side arms 14 of said hangers.

Pistons 20 are reciprocable in the cylinders 18 and have rods 22 depending therefrom which are secured to and support a plate 24. Cables 26 extend through the plate 24 and have the usual cable sockets 28 on lower ends thereof below the plate 24.

Liquid or the like such as oil is supplied the cylinders at the upper ends thereof as will later be described. With liquid in upper ends of the cylinder above the pistons, the elevator is supported from the cable and plate through the piston and cylinders.

A tank T for liquid is supported at 30 by the plate 6. A motor M and a pump P are also supported by said plate.

A valve 32 has a piston 34 reciprocable therein which has a channel 36 in a side thereof for connecting pipes in one of its positions. A rod 36 extends from the piston through an end of the valve and is connected to the armature 38 of a solenoid 40. A spring 42 urges the piston to the closed position shown in Fig. 1.

When the solenoid 40 is energized, the piston is moved to the right to connect the pipes as aforesaid. When deenergized, the piston is returned to the position shown.

A pipe 44 extends from tank T to the pump P and a pipe 46 having a pressure relief valve 48 therein extends from the pump P to a branch 50 connected to the valve 32 and from said branch to connections 52 entering the upper side of the cylinders. A check valve 56 is provided in pipe 46.

A return pipe 56' extends from valve 32 to the tank and has a flow control valve 58 which may be a needle valve therein.

The motor M and pump P are connected by a shaft 58 so that when the motor is in operation, liquid is pumped from the tank through pipe 46 to the cylinders.

The cables 26 which are engaged with a drum or drums driven by an electric motor or motors as a power source support the plate 24. The pistons 20 in cylinders 18 through liquid between the upper sides of the pistons and cylinder support the crosshead which in turn supports the elevator cab or car.

If liquid in the cylinders above the pistons is released the crosshead and car move downwardly relative to plate 24. If liquid is pumped into the cylinder, the cylinders move upwardly relative to the pistons and the crosshead and car move upwardly relative to the plate.

Apparatus to be described controls the motor and valve 32 when the elevator stops at a floor to force liquid into the cylinder or allow it to be displaced therefrom so that the car floor is leveled with the floor. When the car is stopped at a floor its leveling is controlled by leveling means indicated by L.

As the elevator is ascending or descending, the relation of the car and plate 24 and thereby the pistons and cylinders are under the control of centering means indicated by C and means is provided for transferring control between the leveling and centering means.

It is desired that the relative levels of the crosshead and supporting plate 24 be maintained during operation of the elevator up and down in order that the leveling apparatus may operate when the elevator stops at a floor.

A cam 60 is fixed to a plate 62 secured to one rail 10 and has upper and lower cam surfaces 64 and 66.

Bracket means 68 secured to the shoe 8 carries an upper descending switch 72 and a lower ascending switch 74.

Figure 3:
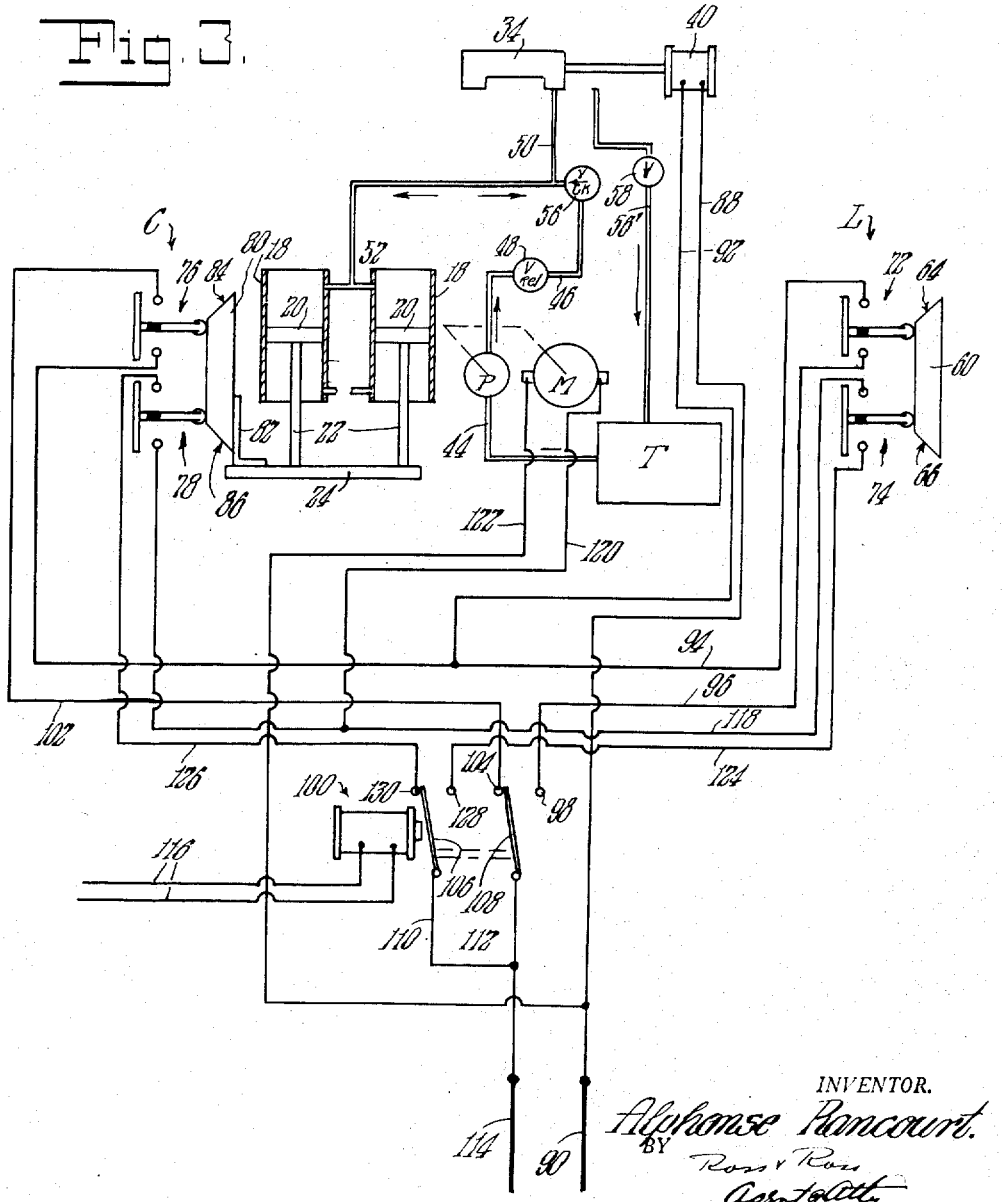
Fig. 3 is a wiring diagram to explain the operation of the apparatus.

These switches have horizontally reciprocable members for engaging a pair of contacts as shown in Fig. 3. As outer ends of the switch members move outwardly when riding over the inclined cam faces, the switch contacts are engaged. Springs urge the movable members outwardly and resist inward movements thereof. These switches constitute parts of the leveling means.

Other switches such as an upper descending switch 76 and a lower ascending switch 78 which are similar to the switches 72 and 74 are carried by the crosshead and are arranged for operation similarly to the aforesaid switches by a cam 80 which is secured to plate 24 by a bracket 82. This cam 80 has inclined cam faces 84 and 86, similar to cam 60.

Solenoid 40 for operating the valve piston is connected by 88 to one side 90 of a power line and by 92 to a connection 94 between one contact each of the switches 72 and 76.

A connection 96 extends from the other contact of switch 72 to a contact 98 of a changeover relay 100. The other contact of switch 76 is connected by 102 to a contact 104 of said relay 100. Arms 106 and 108 of relay 100 are connected by 110 and 112 to the other side 114 of the power line.

Relay 100 is connected by 116 to the electrical circuits of the power source for the elevator motor and is arranged whereby driving up and down movements of the elevator the arms of the relay are held in the position shown. When the power is shut off from the power source for the elevator the arms swing clockwise and engage other contacts.

A connection 118 extends from one of the contacts of each of the switches 74 and 78 and a connection 120 extends from motor M to connection 118. The other side of motor M is connected by 122 to supply line 90.

Other contacts of switches 74 and 78 are connected by lines 124 and 126 to contacts 128 and 130 of relay 100.

As the elevator ascends and descends and with the arms of the relay positioned as shown and described, whenever there is any change in relation of the plate 24 and elevator or crosshead one of the switches 76 or 78 is operated either to open valve 32 and release liquid from the cylinders or to energize the motor for the pumping of liquid into the cylinders.

It is desired to maintain the pistons 18 intermediate upper and lower ends of the cylinders thereby to allow the leveling mechanism to operate when the elevator is stopped at a floor and it is necessary to level the car.

When the elevator is stopped at a floor and when the relay is de-energized, the arms swing to make contacts 98 and 128 so that the motor and solenoid are under the control of switches 72 and 74.

If the level of the floor of the car is above the floor at which the car is stopped, switch 72 makes its contacts so that the solenoid is energized to shift piston 34. In this shifted position of the piston, fluid flows from the cylinders back to the tank and when the leveling has taken place, switch 72 is opened and piston 34 is moved to the left to prevent displacement of liquid from the cylinders.

If the car stops below the level of the floor, switch 74 makes contact to energize the motor so that liquid is pumped into the cylinders to elevate the cylinders and thereby the car. As the car is leveled, the switch 74 is opened.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters [Patents] *Patent* of the United States is:

1. Mechanism for adjusting the supporting cables and cross-head of an elevator for leveling the floor thereof comprising in combination, a supporting plate supported by said cables, adjustable means between said plate and crosshead adapted to maintain predetermined relative levels of said crosshead and plate during up and down movements thereof, operating means for said adjustable means, centering means for controlling said operating means as said plate moves up and down, leveling means for controlling said operating means as said plate is in rest position, and means for transferring the control of said operating means between said centering and [levelling] *leveling* means accordingly as the plate is moving up and down or is at rest, said adjustable means including a [piston] *cylinder* secured to said crosshead and a [cylinder] *piston* reciprocable therein secured to said plate, said operating means including a motor driven pump and connections including a change over valve between said cylinder and a pump arranged whereby liquids may be displaced from or delivered to said cylinder, said centering means including a cam on said supporting plate and circuit closing switches on said crosshead and a source of power with connections between said switches, source of power and motor driven pump, said leveling means including circuit closing switches on said crosshead operable by a stationary cam and connections between said switches, source of power and valve and motor driven pump.

2. Mechanism for adjusting the supporting cables and crosshead of an elevator for leveling the floor thereof comprising in combination a supporting plate supported by said cables, adjustable means between said plate and crosshead adapted to maintain predetermined relative levels of said crosshead and plate during up and down movements thereof, operating means for said adjustable means, centering means for controlling said operating means as said plate moves up and down, leveling means for controlling said operating means as said plate is in rest position, and means for transferring the control of said operating means between said centering and leveling means accordingly as the plate is moving up and down or is at rest, said adjustable means including a [piston] *cylinder* secured to said crosshead and a [cylinder] *piston* reciprocable therein secured to said plate, said operating means including a motor driven pump and connections including a change over valve between said cylinder and a pump arranged whereby liquid may be displaced from or delivered to said cylinder, said centering means including a cam on said supporting plate and circuit closing switches on said crosshead and a source of power with connections between said switches, source of power and motor driven pump, said leveling means including circuit closing switches on said crosshead operable by a stationary cam and connections between said switches, source of power and valve and motor driven pump, said means for transferring the control of said operating means between said centering and leveling means including electrically operated circuit and an opening and closing relay in the said connections.

References Cited in the file of this patent or the original patent

UNITED STATES PATENTS

| | | |
|---|---|---|
| 1,669,184 | Baker | May 8, 1928 |
| 1,682,209 | Baker | Aug. 28, 1928 |